T. ROSS.
TIME RECORDER.
APPLICATION FILED JULY 10, 1915.

1,262,703.

Patented Apr. 16, 1918.
12 SHEETS—SHEET 1.

Witnesses
Robert H. Weir
Arthur W. Carson

Inventor
Torey Ross
By Casper L. Redfield
Atty.

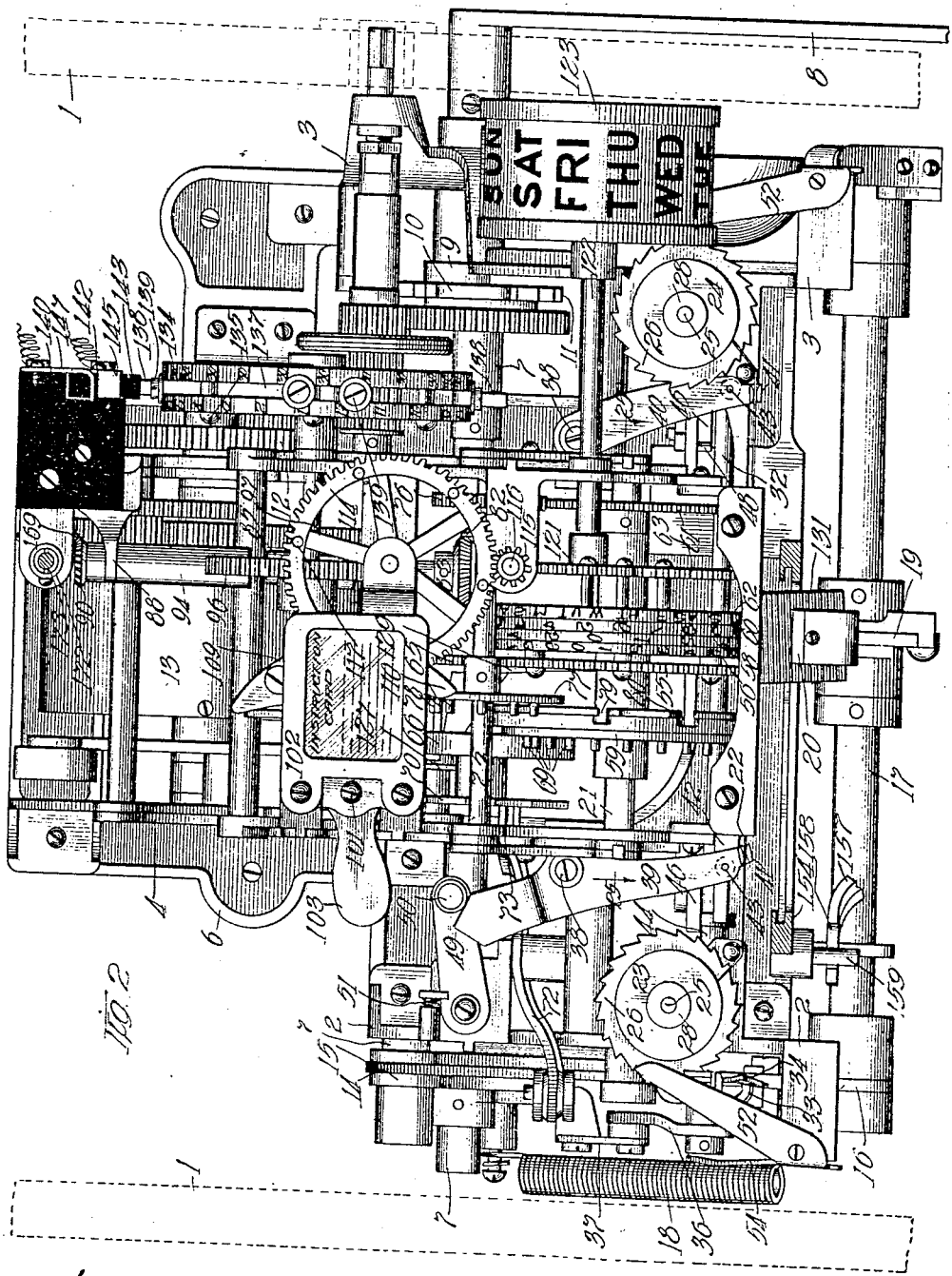

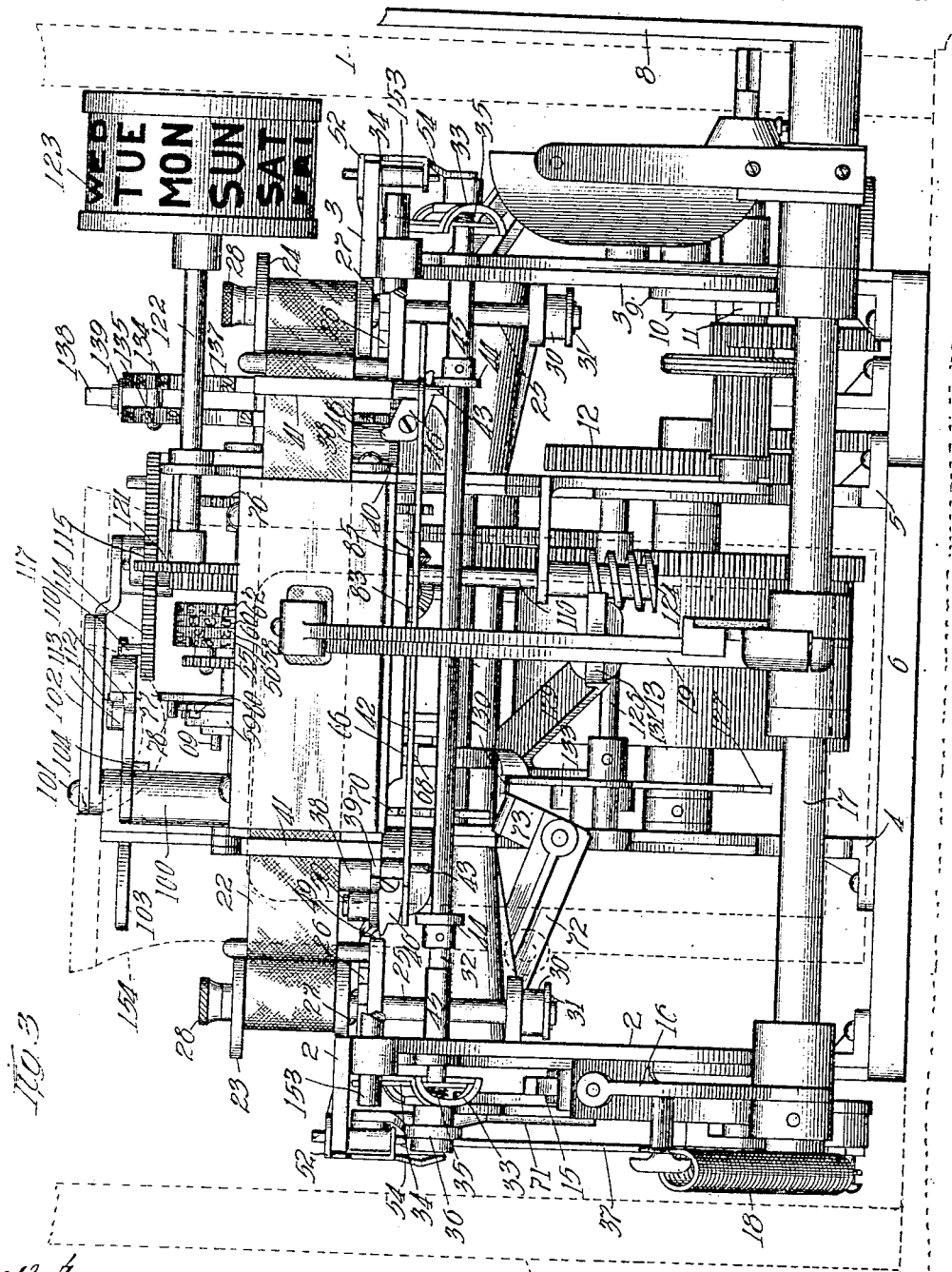

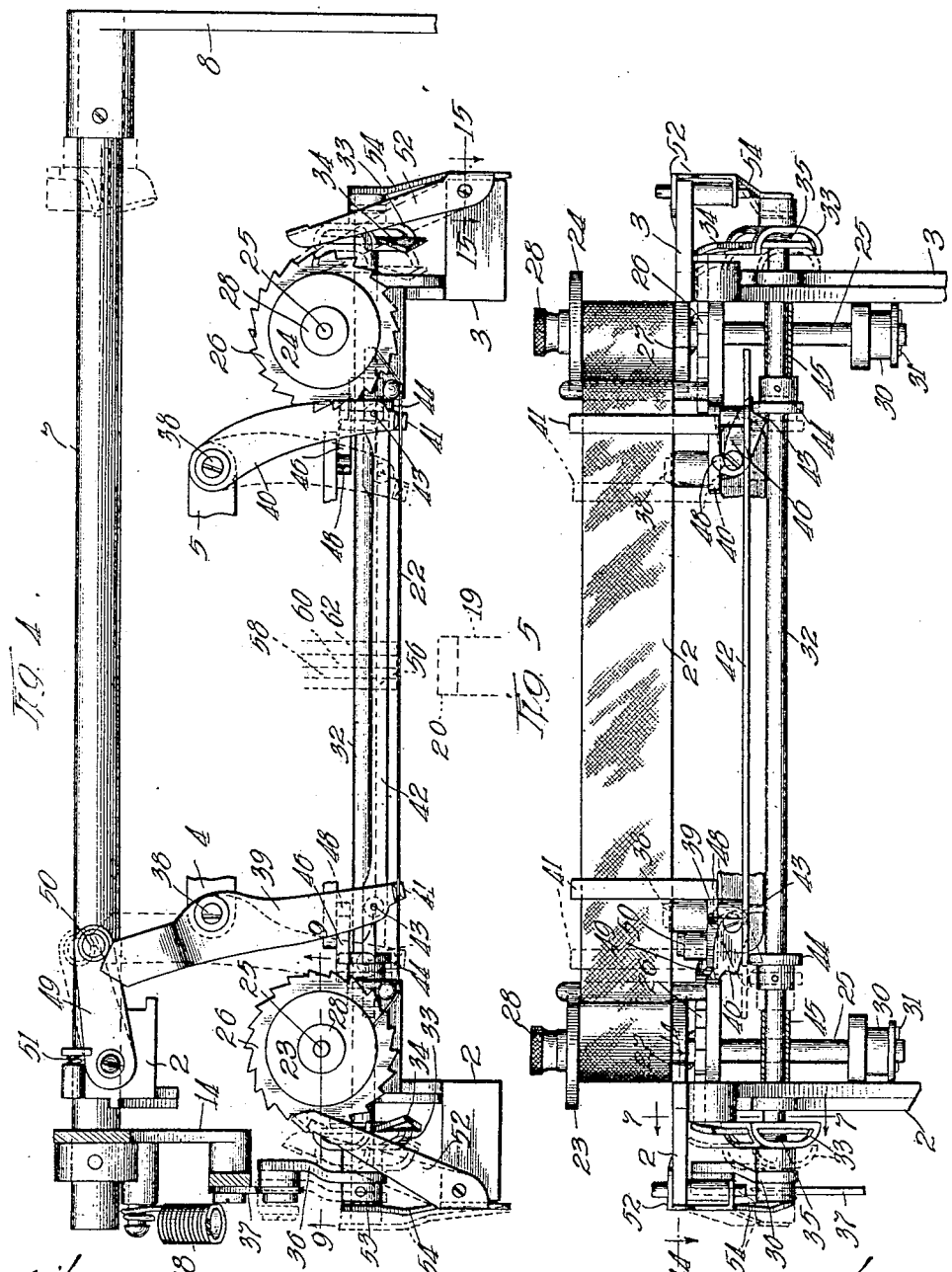

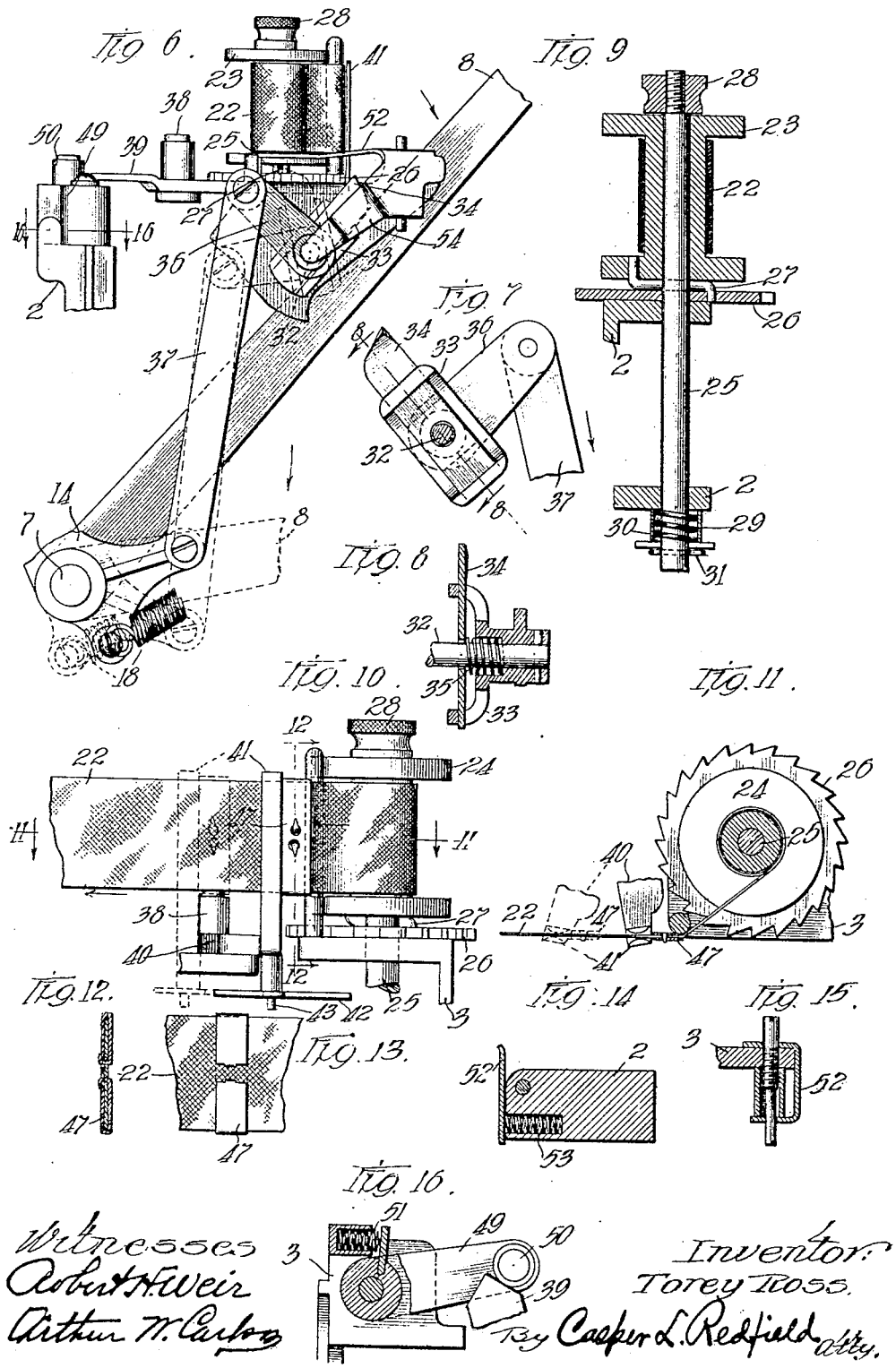

T. ROSS.
TIME RECORDER.
APPLICATION FILED JULY 10, 1915.
1,262,703.
Patented Apr. 16, 1918.
12 SHEETS—SHEET 6.
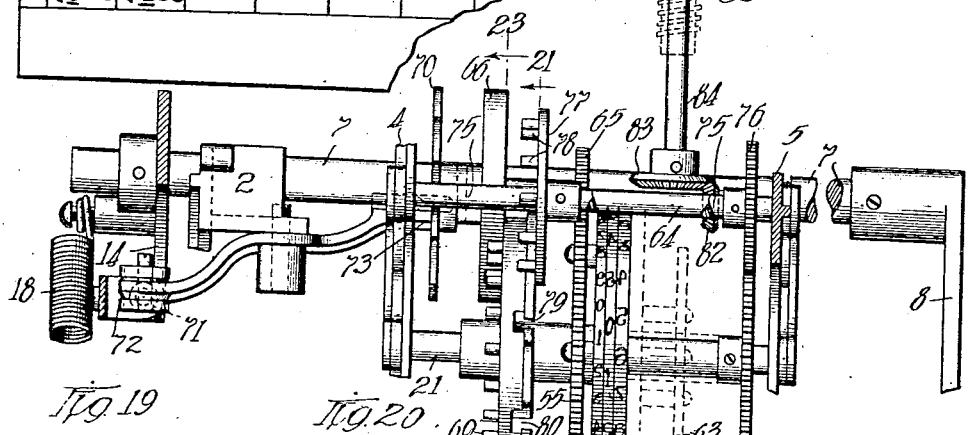

T. ROSS.
TIME RECORDER.
APPLICATION FILED JULY 10, 1915.

1,262,703.

Patented Apr. 16, 1918.
12 SHEETS—SHEET 7.

Witnesses:
Robert H. Weir
Arthur W. Carson

Inventor:
Torey Ross.
By Casper L. Redfield
Atty.

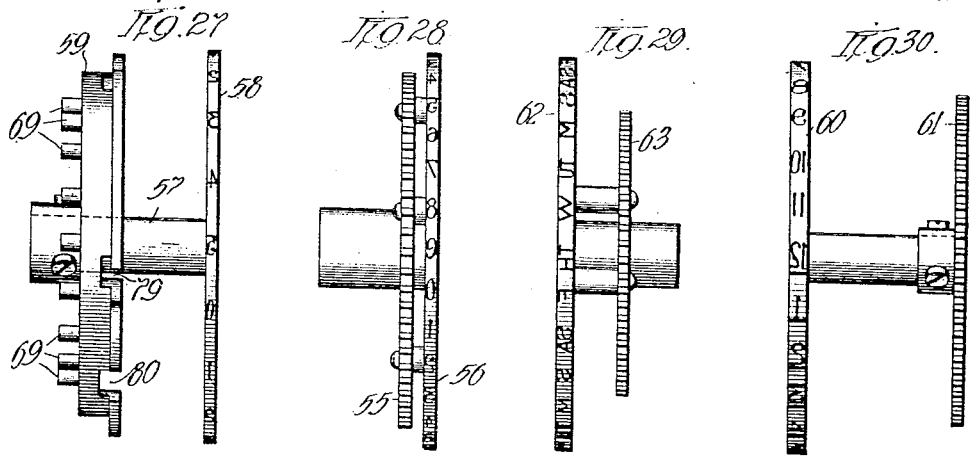
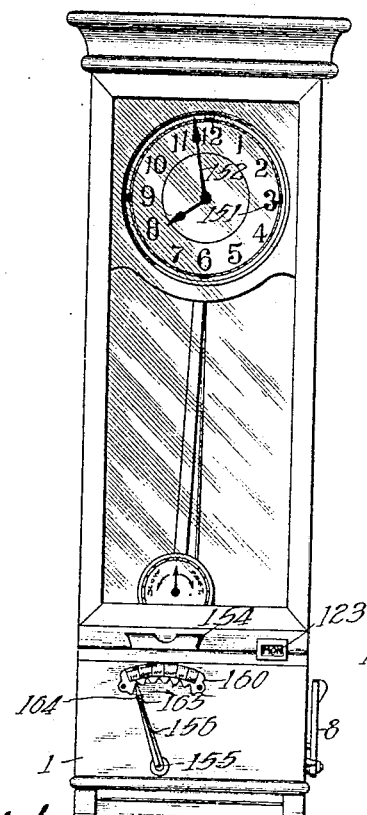
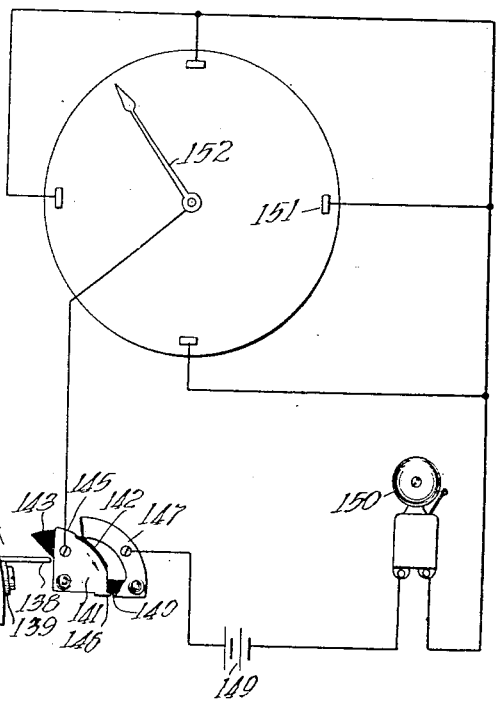

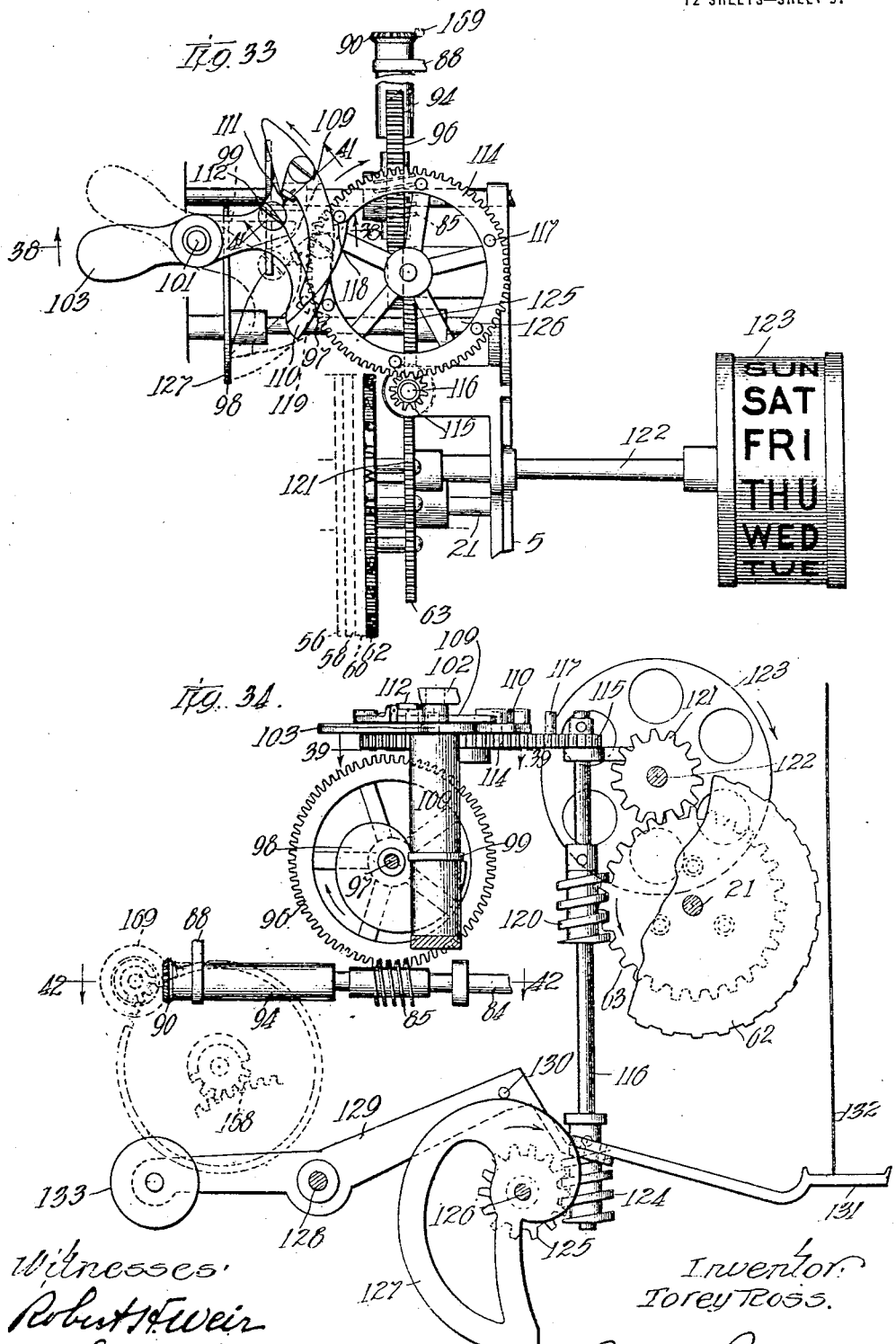

T. ROSS.
TIME RECORDER.
APPLICATION FILED JULY 10, 1915.
1,262,703.
Patented Apr. 16, 1918.
12 SHEETS—SHEET 10.
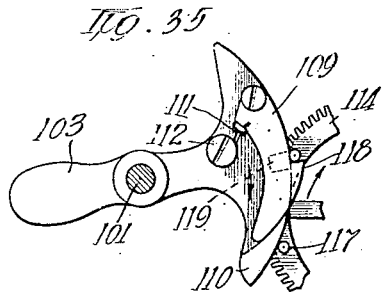
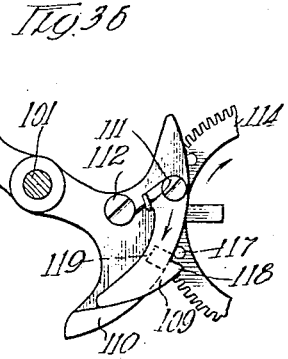
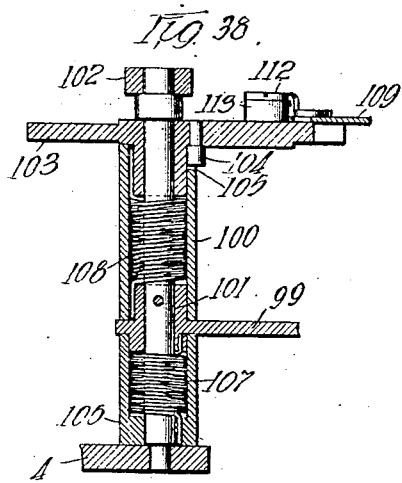
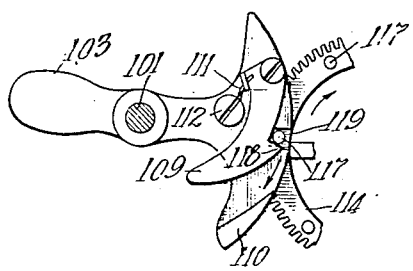
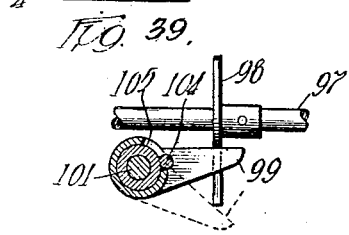
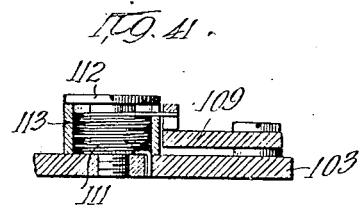
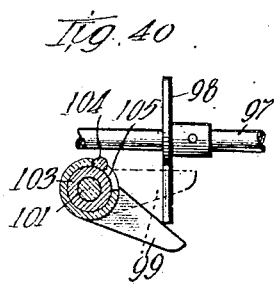
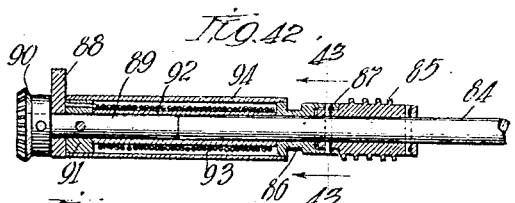
Witnesses,
Robert H. Weir
Arthur W. Carter
Inventor
Torcy Ross,
By Casper L. Redfield atty.

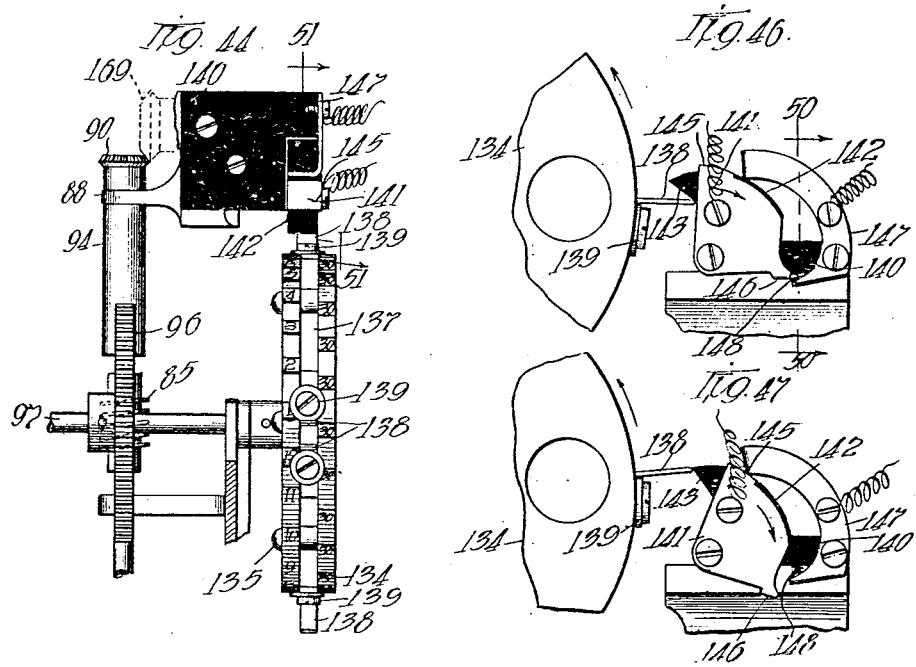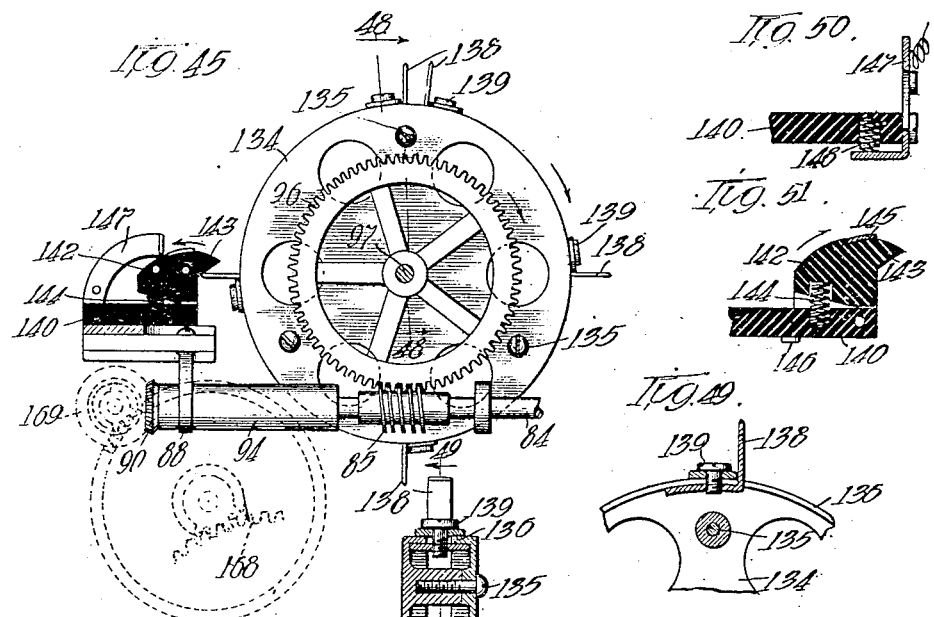

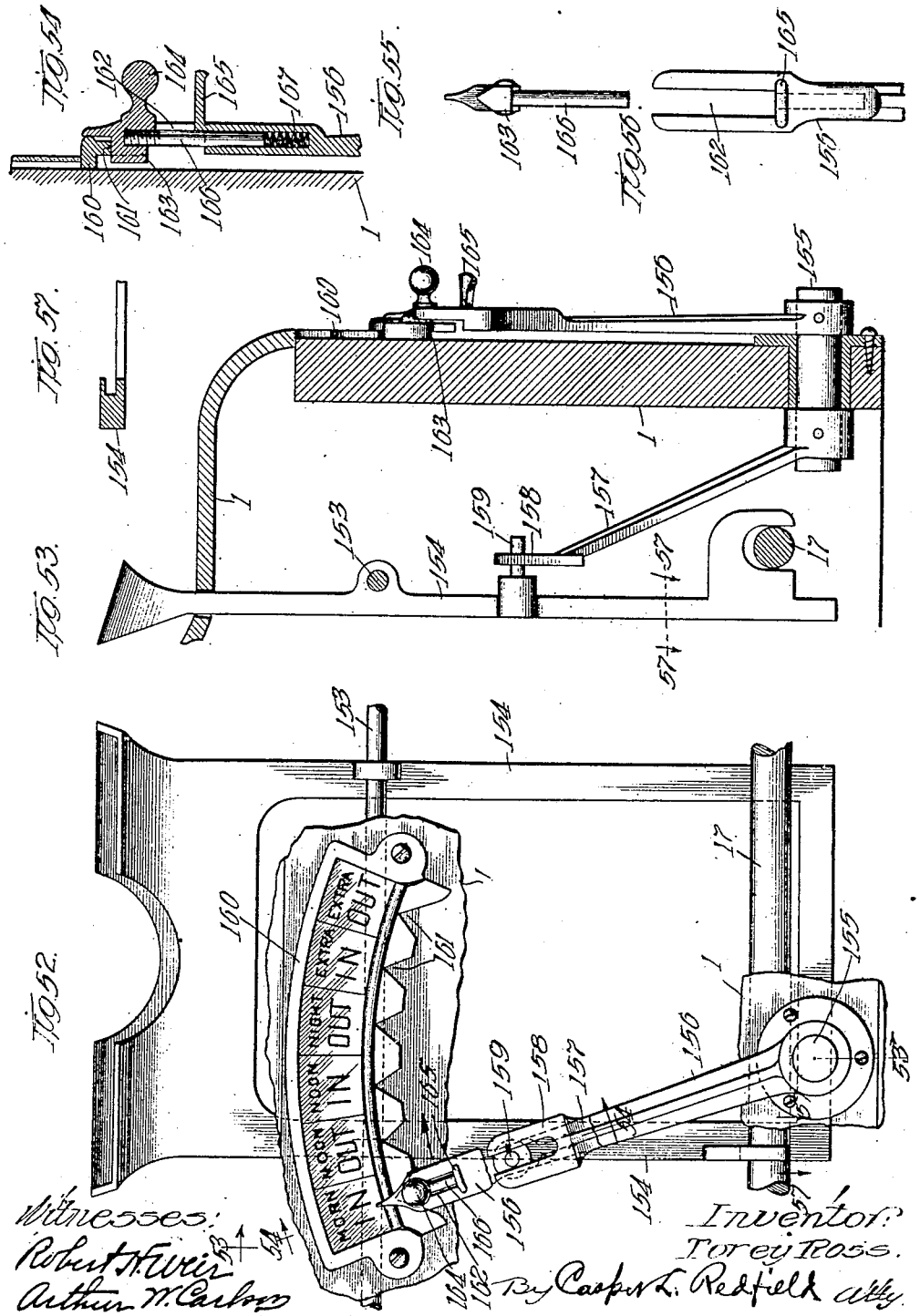

UNITED STATES PATENT OFFICE.

TORREY ROSS, OF CHICAGO, ILLINOIS.

TIME-RECORDER.

1,262,703.　　　　　Specification of Letters Patent.　　Patented Apr. 16, 1918.

Application filed July 10, 1915.　Serial No. 39,133.

*To all whom it may concern:*

Be it known that I, TORREY ROSS, a citizen of the United States of America, and a resident of Chicago, county of Cook, and State of Illinois, have invented certain new and useful Improvements in Time-Recorders, of which the following is a specification.

My invention relates to time recorders and has for its object improvements in such devices. Among these improvements it is desirable to mention a few specifically as a preliminary to a more full discussion of the apparatus.

One of the objects to be attained is locking together certain parts of the apparatus which are operated in unison, and which if not locked together might have some parts displaced with respect to other parts.

Special locking and centering devices are provided for the type wheels and so arranged as to obtain several distinct advantages over the forms of apparatus usually employed for moving and controlling those wheels.

The devices used for setting the apparatus, for controlling the ribbon reverse, for preventing tampering and for generally improving the construction and operation of time recorders will be set forth hereinafter.

In the accompanying drawings—

Fig. 2 is a plan, parts of the inclosing casing being shown in dotted lines at each side;

Fig. 3 is a front elevation with the card receiver and sides of the casing in dotted lines;

Fig. 4 is a plan of the ribbon operating and controlling mechanism with its connections to the shaft and lever used in operating the mechanism;

Fig. 5 is a front elevation of the upper parts of the apparatus shown in Fig. 4;

Fig. 6 is a side elevation of Fig. 4, the view being similar to that of Fig. 1;

Fig. 7 is a section on line 7—7 of Fig. 5;

Fig. 8 is a section on line 8—8 of Fig. 7;

Fig. 9 is a section on line 9—9 of Fig. 4;

Fig. 10 is an enlarged view of parts of the apparatus shown at the right of Fig. 5;

Figs. 11 and 12 are sections on lines 11—11 and 12—12, respectively, of Fig. 10;

Fig. 13 is a rear elevation of a portion of the ribbon, and corresponding to the section shown in Fig. 12;

Fig. 14 is a section on line 14—14 of Fig. 5;

Fig. 15 is a section on line 15—15 of Fig. 4;

Fig. 16 is a section on line 16—16 of Fig. 6;

Figure 1:
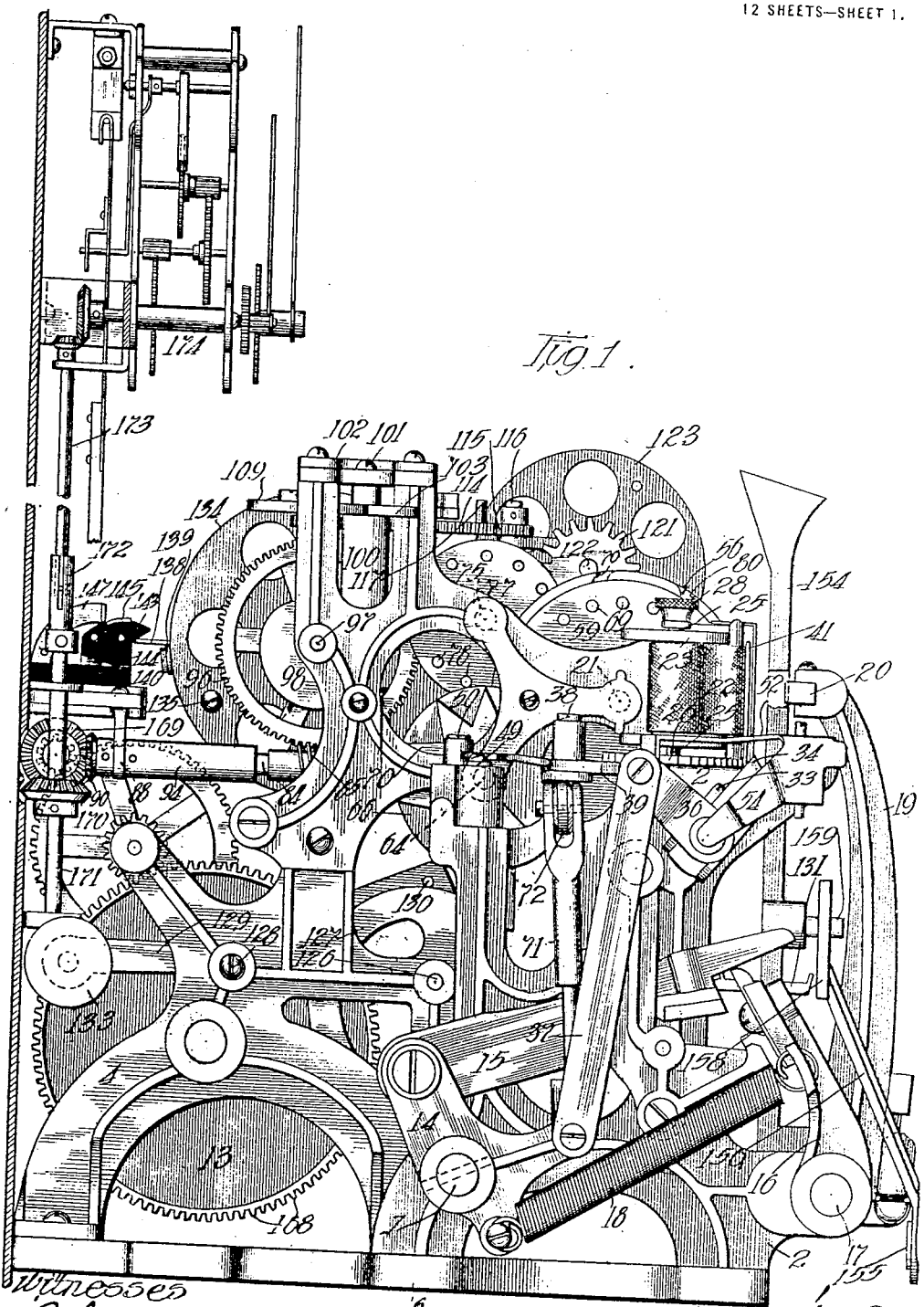
Figure 1 is a side elevation of the operating mechanism, a portion of the clock mechanism for controlling the operating mechanism being shown at the upper left hand of the figure.
Figure 21:
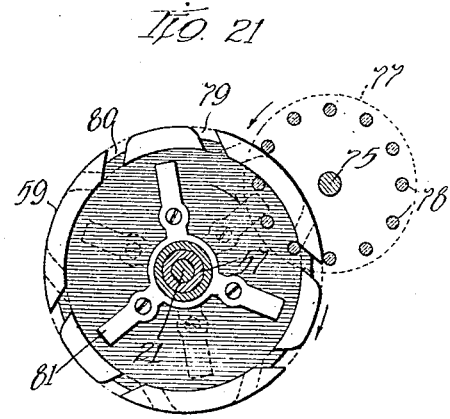
Figure 22:
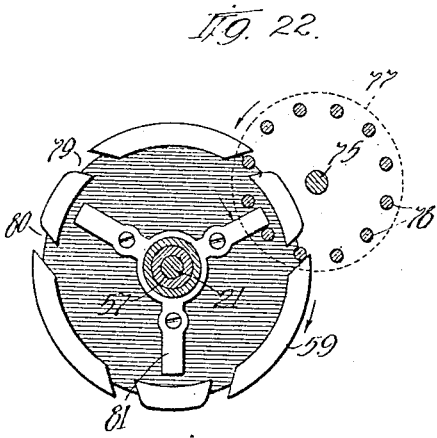
Figure 23:
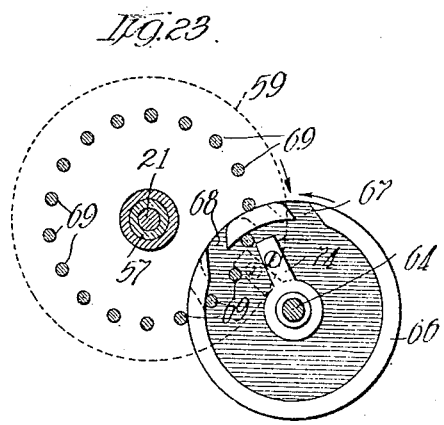
Figure 24:
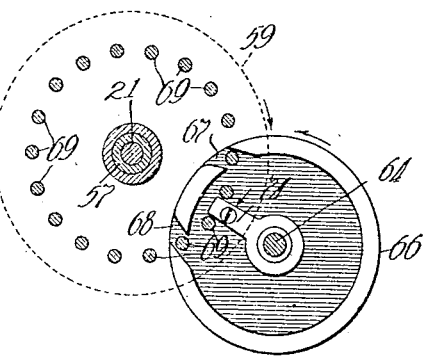
Figure 25:
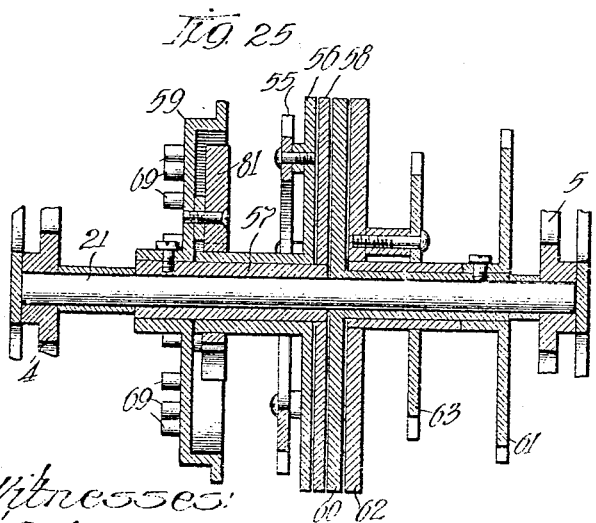
Figure 26:
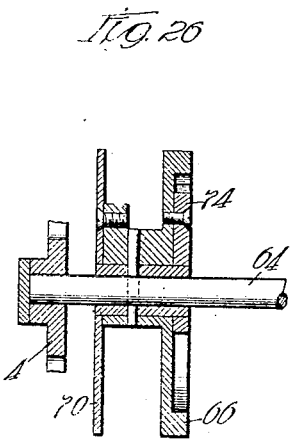

Fig. 17 is a plan of the type wheels and their locking mechanism, some associated parts being partly in section;

Fig. 18 is a side elevation of the parts shown in Fig. 17, the view being the same as that of Fig. 1;

Figs. 19 and 20 show different positions of the star wheel and alining knife for controlling the minute type wheel;

Fig. 21 is a section on line 21—21 of Fig. 17;

Fig. 22 represents the parts of Fig. 21 in a different position;

Figs. 23 and 24 are similar different positions of parts shown by section on line 23—23 of Fig. 17;

Fig. 25 is a central longitudinal section of all of the parts supported on the type wheel shaft;

Fig. 26 is a section on line 26—26 of Fig. 18;

Figs. 27 to 30, inclusive, are elevations of the wheels shown in section in Fig. 25;

Fig. 31 is a front elevation, at a reduced scale, of the entire apparatus as it appears when in use;

Fig. 32 is a diagram of the electric circuits for the start and stop signal;

Fig. 33 is a detached plan of the driving and setting apparatus as it appears in Fig. 2;

Fig. 34 is a side elevation of Fig. 33, additional connected parts being shown and the view corresponding to that of Fig. 1;

Figs. 35, 36 and 37 are plans of the independent setting apparatus in different positions;

Fig. 38 is a section on line 38—38 of Fig. 33;

Figs. 39 and 40 are two positions of a section on line 39—39 of Fig. 34;

Fig. 41 is an enlarged section on line 41—41 of Fig. 33;

Fig. 42 is a section on line 42—42 of Fig. 34;

Fig. 43 is an enlarged section on line 43—43 of Fig. 42;

Figs. 44 and 45 are plan and elevation, respectively, of the apparatus for controlling the start and stop signal;

Figs. 46 and 47 are different positions of the contact closer controlling the circuit shown in Fig. 32;

Fig. 48 is a section on line 48—48 of Fig. 45;

Fig. 49 is a section on line 49—49 of Fig. 48;

Fig. 50 is a section on line 50—50 of Fig. 46;

Fig. 51 is a section on line 51—51 of Fig. 44;

Fig. 52 is a front elevation of the card receiver and devices for adjusting its position;

Fig. 53 is a side elevation, the casing appearing in section on line 53—53 of Fig. 52; and Figs. 54, 55, 56 and 57 are details.

Fig. 58 is a view of a record made by the machine.

The operating mechanism is inclosed in a casing 1 and is supported by standards 2, 3, 4 and 5, which constitutes a frame work mounted upon a base plate 6. Supported in the standards 2 and 3 is a main shaft 7 which extends through the side of the casing and carries an operating lever 8. On the shaft 7 is an arm 9 having a pawl 10 operating on a ratchet wheel 11 and through a train of gears to drive the large gear 12 which is connected to the motor spring located in the spring case 13. The arrangement is such that when the arm 8 is depressed to operate that apparatus as will hereinafter be described, each depression of the arm will act to wind the motor spring to a small extent.

On the other end of the shaft 7 is secured a lever 14 (Fig. 1) to one arm of which is pivoted a thrust rod 15. When the lever 8 is manually depressed, the thrust rod 15 engages the end of the arm 16 fast upon a shaft 17 running across the front of the machine. The arrangement is such that after the thrust rod has moved a certain distance it is automatically released from the arm 16, whereupon the spring 18 acts to suddenly return the arm 16 to its normal position as shown in Fig. 1. The spring 18 also acts to return the shaft 7 to normal position when the manually operated lever 8 is released. On the shaft 17 is an arm 19 having a hammer 20 for engaging the back of a workman's time card to drive it against the type wheels to be hereinafter described.

The details of the connections from the shaft 7 to the motor spring for winding it have been set forth in my pending application, Serial Number 5,405, filed February 1, 1915, and form no part of the present invention. The connections from the shaft 7 to the hammer 20 are, for the most part, well known. They have been described in the above mentioned application and are not directly involved in the present invention.

Supported in the upper part of the frame work is a shaft 21 upon which are supported certain type wheels. Between these type wheels and the hammer 20 is a ribbon 22 which is mounted upon spools 23 and 24, which spools are mounted on spindles 25 carried by the frame work. Connected with each spool is a ratchet wheel 26, the connection being by a cotter 27 (Fig. 9) which extends through the spindle 25 and has its ends turned upward and downward to engage the spool and ratchet respectively. A nut 28 on the end of the spindle 25 holds its spool in place. By unscrewing the nut 28 the spool may be lifted from the upturned end of the cotter 27. On the lower end of each spindle 25 is a friction spring 29 inclosed by a short piece of tubing 30 and held in place by a transverse pin 31. The object of the springs 29 is to prevent slack occurring in the ribbon by providing a frictional resistance for each spool.

Supported in the standards 2 and 3, and below the spools 23 and 24, is a shaft 32 (Fig. 5) on the ends of which are secured pawl holders 33 shown in detail in Figs. 7 and 8. These holders have slotted arms extending each side of the shaft 32, and through the slots of each holder is inserted a pawl 34 for engaging the teeth of the adjacent ratchet wheel 26. Each pawl 34 has a central hole through which the shaft 32 passes. This hole is small enough to retain the pawl in its proper longitudinal position in its holder, but large enough to permit the pawl to be tilted in its holder. (See Fig. 8). A spring 35 acts to normally hold the pawl at the outer ends of the retaining slots.

On the pawl holder 33 at the left side of the machine is an arm 36 to which is connected a link 37, the other end of which link is connected to one of the arms on the lever 14. When the hand lever 8 is depressed, the connections 14, 37 and 36 operate to oscillate the shaft 32.

At points 38 (Figs. 2 and 4) on the framework are pivoted arms 39 and 40, on the front end of each of which is an upstanding pair of fingers 41 between which runs the ribbon 22. The arms 39 and 40 are connected together below by a link 42 provided with projecting pins 43 adapted to engage collars 44 fast on shaft 32. In Fig. 10, the pin 43 at the right is shown in position, but in Fig. 5 this pin has been omitted from the drawing to permit a view of the lock behind.

The shaft 32 is movable longitudinally in its bearings in the framework, the amount of such movement being limited by loose sleeves 45 between the collars 44 and the bearings in the frame. These sleeves are shown in section in Fig. 5. When the arms 39 and 40 are moved to the position shown in full lines in Fig. 4, the pin 43 at the right (Fig. 10) engages the right hand collar 44 to drive the shaft 32, and parts carried thereby, to the position shown in full lines in Fig. 5. In this position an adjacent gravity dog or catch 46 drops behind the collar and prevents a movement of the shaft 32 to the left when the pin 43 leaves contact with the collar as will be described.

Secured to the ribbon near its ends are metal bands 47 (Figs. 10, 11, 12 and 13) which are arranged to engage the fingers 41 on the arms 39 and 40 to swing them on their pivots 38. When the ribbon in moving to the left is nearly unwound from the spool 24, the band 47 at the right hand end engages the fingers 41, as shown in Fig. 10, to move the arms 40 and 39 from the full line to the dotted line position as shown in Figs. 4 and 5. In this movement the pin 43 at the right (Fig. 10) leaves the right hand collar (Fig. 5), but the catch 46 still holds the collar until the arm 40 engages the tail 48 (Figs. 4 and 5) on the rear of catch 46 to lift it clear of the collar.

At a suitable point on the standard 2 is pivoted an arm 49 which has a pin 50 (Figs. 4 and 16) held in engagement with the pointed rear end of arm 39 by means of a push spring 51. These parts operate in a well known manner to force the arms 39 and 40 to one or the other of their extreme positions. When the band 47 on the ribbon moves the arm 40, and through the link 42 also moves the arm 39, the said arm 40 engages the tail 48 of catch 46 to lift that catch from the collar 44 after the time the pointed end of the arm 39 passes the center of the pin 50. Spring 51 then acts to throw the arms 39 and 40 sharply to the left and cause the left hand pin 43 to engage the adjacent collar 44 and move the shaft 32 to the left.

As described before, the shaft 32 is rocked each time the hand lever 8 is depressed. The pawl holders 33 are so located on the shaft 32 that when the shaft is to the right the left hand pawl 34 will engage its ratchet wheel 26 to move it one or two teeth each time the shaft is rocked. But with the shaft to the right, the right hand pawl 34 will be clear from its ratchet wheel and will not move said wheel when the shaft is rocked. When the shaft is to the left the reverse conditions exist and the ribbon will be moved in the opposite direction.

Pivoted at suitable places on the framework are holding pawls 52 (Figs. 2, 4 and 5) which engage the ratchet wheels 26 and prevent their return movement when being advanced by pawls 34. Springs 53 (Fig. 14) act to produce such engagement. On each holding pawl 52 is an arm 54 (Figs. 1, 4, 5 and 6) which engages the adjacent end of the longitudinally movable rock shaft 32. When the shaft 32 is moved to cause the engagement of one driving pawl 34 and cause the release of the other, it also brings about a corresponding engagement and release of the adjacent holding pawl 52.

Supported in the frame work behind the center of the ribbon 22 is a shaft or supporting rod 21 (Fig. 25) upon which are mounted certain wheels. These wheels are mounted either directly upon the shaft or upon sleeves carried by the shaft. One of the wheels is a gear 55 (Figs. 17, 25 and 28) which is bolted to a units type wheel 56 loosely mounted upon a sleeve 57. Secured to opposite ends of the sleeve 57 are a tens type wheel 58 and a central or main locking wheel 59. The units and tens wheels are for recording the minutes in an hour.

The wheels mounted upon shaft 21, and their connection with each other, are shown spread out in Figs. 27, 28, 29, 30. In Fig. 27, the tens wheel 58 is shown connected to the main locking wheel 59 by a sleeve 57 which is loosely mounted upon shaft 21. In Fig. 28, the gear 55 is shown bolted to the units wheel 56, the hub of which is loosely mounted upon the sleeve 57 between the wheels 58 and 59 shown in Fig. 27. In Fig. 30 is shown the hour wheel 60, on the hub of which is secured its driving gear 61. These are loosely mounted on shaft 21. In Fig. 29 is the day wheel 62, to which is bolted its driving gear 63. The hub of wheel 62 is loosely mounted upon the hub or sleeve which connects the wheels shown in Fig. 30.

From the foregoing it will be seen that the wheels mounted upon shaft 21 are secured together in pairs, each pair being movable with respect to the other pairs. Each pair consists of a registering wheel and a driving wheel therefor. In Figs. 28, 29, and 30, the driving wheels are gears driven from other shafts. In Fig. 27 the driving wheel is a lock wheel 59 which is driven step by step by another wheel 66 which interlocks with it as shown in Figs. 23 and 24. The wheel 59 also interlocks with a wheel 77 which it in turn drives step by step as shown in Figs. 21 and 22.

Adjacent to the tens wheel is an hour wheel 60 which has a gear 61 secured to its hub. Loosely mounted upon the hub of wheel 60 is a day wheel 62 having a gear 63 bolted thereto. Between the wheels and the framework are spacing collars shown in section in Fig. 25 but which may be considered as parts of the shaft 21.

Adjacent to the shaft 21 is a shaft 64 on which is a pinion 65 for driving gear 55; a tens lock wheel 66 having a flange provided with slots 67 and 68 which coöperate with pins 69 on the main lock wheel 59; and a star wheel 70 which operates as a units lock. These parts are secured together and move in unison.

Attached to one of the arms of the lever 14 (Fig. 1) is a link 71 having its upper end connected to a tilting lever 72. On the inner end of the lever 72 is an alining or positioning knife 73 arranged to engage the star wheel 70 and definitely center it each time the hand lever 8 is depressed to operate the hammer 20. As the star wheel is directly connected to the units wheel 56 through the gears 65 and 55, it will be evident that the knife 73 entering between two teeth on the star wheel will serve to bring the proper figure on the units wheel 56 accurately to the printing point in front of the hammer 20.

The tens lock wheel 66 overlaps the main lock wheel 59 as shown in Figs. 17, 18, 23 and 24. The thickness of the flange on the wheel 66 is such that it passes freely between pins 69 on the wheel 59, but said flange holds wheel 59 from turning when the wheel 66 is in any position except that in which slots 67 and 68 coincide with two pins 69. Secured to the side of wheel 66 inside of its flange is an arm 74 arranged to enter the space between two pins 69 when the slots 67 and 68 come opposite the adjacent pins 69. The operation can be seen by inspecting Figs. 23 and 24 which represent two stages in the operation of advancing the wheel 59 the distance between one pin and the next. The drawing represents eighteen pins 69, hence wheel 66 will make eighteen revolutions to one of wheel 59.

Over the shaft 64 is a shaft 75 having a gear 76 meshing with gear 61 to drive the hour type wheel 60, and an hour lock wheel 77 having pins 78 which coöperate with slots 79 and 80 in the flange of the main lock wheel 59. In wheel 77 there are twelve pins 78, and in wheel 59 there are three pairs of slots 79—80. Consequently, wheel 59 makes four revolutions to one revolution of wheel 77.

Inside of the flange of the main lock wheel 59 are three arms 81 which correspond to the three pairs of slots 79—80, and which coöperate with the pins 78 in the same way that arm 74 coöperates with pins 69 in wheel 59. See Figs. 21 and 22. It is to be observed that arm 74 on wheel 66 acts upon the pins 69 to drive wheel 59, and that the arms 81 on wheel 59 act upon pins 78 to drive wheel 77. In other words, the lock wheels 66, 59 and 77, and the type wheel 56, 58 and 60 are all driven from the shaft 64. It is not necessary, as in other devices, to have independent drives for the different wheels.

The shaft 64 which carries the star wheel 70 has on it a bevel gear 82 driven by a bevel gear 83 on shaft 84 (Figs. 17 and 18). A worm 85 and a sleeve 86 are connected to shaft 84 by a pin 87 (Figs. 42 and 43). Supported in a bracket 88 on the frame work is a shaft 89 having a bevel gear 90 and a collar 91. The shafts 84 and 89 have the same axis and have their abutting ends held in line by a sleeve 92 between the sleeve 86 and the collar 91. Surrounding the sleeve 92 is a spring 93 having one end secured to the collar 91 and the other end projecting through a hub or collar on the end of the sleeve 86. Surrounding the spring 93, and secured to the collar 91 but loose on the hub of the sleeve 86, is an inclosing sleeve or tube 94 having a lip 95 turned inward and forming an abutment for the end of the spring 93 which extends through the hub on sleeve 86. The spring 93 acts as a yielding connection between shafts 89 and 84, the construction being such that the shaft 84 may be held stationary for a period of time amounting to nearly that required for one revolution of the shaft 89 without interfering with the drive delivered to the clock mechanism. Upon releasing any such hold or stoppage of shaft 84, the spring 93 acts to advance the delayed shaft rapidly to its normal relationship to shaft 89 and gear 90.

Returning now to the alining knife 73, it will be seen by inspection of Figs. 18, 19 and 20, that the center of the knife is not directly beneath the center of the shaft 64, but is located slightly to one side. When the knife is squarely in the crotch of the star wheel, as shown in Fig. 20, the character or figure on the units wheel 56 is accurately positioned in the printing line under hammer 20. But workmen in operating hand lever 8 to record their time seldom find the star wheel in this exact position. In practically all cases the knife strikes on one side or the other of some tooth in the star wheel and moves it through a short space to position the units wheel 56. If the knife strikes as illustrated in Fig. 19 it moves the star wheel backward to the position shown in Fig. 20, the spring 93 of Fig. 42 yielding to permit this backward movement. If the knife strikes on the other side of a tooth, the advance of the star wheel is much less than the retarding movement before described and only as much as would take up the ordinary slack or lost motion in the parts back from the star wheel to the shaft 84.

Heretofore it has been the practice to put the units and tens for minutes in the hour on one wheel having sixty divisions or numbers thereon. When so constructed, the star wheel, or corresponding locking device, must have numerous small teeth or there must be a high ratio of gearing which permits of much lost motion and consequent inaccuracy of alinement at the printing point. If the star wheel has numerous small teeth (sixty in direct connections) there is continual danger of the alining or positioning device striking the points of the teeth on the star wheel and bringing about a failure of proper alinement. A frequent repetition of this blunts or batters the teeth so that the trouble increases the longer the machine is used.

By placing the units and tens for the minutes on separate wheels I overcome this difficulty. As shown in the drawings, the units wheel 56 is arranged to have three sets of figures, 0 to 9 inclusive, on its periphery, and the gearing is such that the star wheel makes three revolutions to one of the units wheel. By this means the star wheel has only ten teeth which may be large. By making the points of these teeth sharp, and also making the edge of the knife 73 sharp, the chances of the knife battering the points of the star wheel teeth are reduced to practically zero.

As the largest number of minutes to be recorded is fifty-nine, the tens wheel does not need any figure larger than "5". I have arranged these figures in three groups (0 to 5 inclusive) on the periphery of the tens wheel 58 with the result that this wheel has only eighteen divisions and makes one complete revolution in three hours. With thirty divisions on the units wheel and eighteen divisions on the tens wheel it will be evident that I can have more space between numbers for a given size of wheel than is possible when the entire sixty divisions (minutes) in an hour are placed on one wheel.

In practice workmen use the time recorder principally in the ten minutes immediately preceding and succeeding the hour shift. In machines which use sixty divisions (minutes) on one wheel this throws almost the entire work on those parts of the wheel which are adjacent to the "0" point with very little work on other parts. As type get dirty by use with a ribbon the concentration of nearly all the work on a few type make frequent cleaning necessary. The separation of units and tens onto two wheels overcomes this objection to present devices by distributing the work uniformly over all numbers on each wheel. Thus, the units wheel having three divisions of ten figures each, one division will be used at one time and another division at another time, all three divisions coming into practically equal use in long periods of time. The same is true of the tens wheel which makes one revolution in three hours,—the three hours not matching in four or five hours interval between beginning work in the morning and beginning work in the afternoon.

The hour wheel 60 has twenty-four divisions and makes one revolution in twenty-four hours. As the tens wheel 58 and lock wheel 59 (Figs. 21 and 27) make one revolution in three hours and four revolutions to one revolution of the shaft 75 it will be evident that gear 76 (Fig. 17) will be one-half the diameter of gear 61 to cause the hour wheel 60 to make one revolution in twenty-four hours.

By observing the connections heretofore described it will be seen that the lock wheels 66, 59 and 77 serve to maintain the units wheel 56, and tens wheel 58 and the hour wheel 60 always in the same relationship to each other and in unison with the clock mechanism which is connected to and controls the gear 90. In other words, the wheels which indicate the hours and minutes are permanently locked together and can never get out of step with the clock mechanism. This avoids the necessity of adjusting the hour and minute wheels with respect to each other which frequently occurs in those machines which have independent drives for such wheels.

The worm 85 on shaft 84 (Figs. 34, 42, 44 and 45) engages a gear 96 on shaft 97, which shaft makes one revolution in twenty-four hours. On the shaft 97 is a volute cam 98 which, during a period of twenty-four hours, forces an arm 99 from an inner position shown in Fig. 39 to an outer position shown in Fig. 40, after which the arm returns to its inner position by spring action to be again forced out by the cam 98. The arm 99 and a sleeve or inclosing tube 100 (Fig. 38) are pinned to a spindle 101 which is supported below in the framework and above by a bracket 102 secured to the frame work. Loosely mounted upon the upper end of the spindle 101 is a lever 103 having a pin 104 operating in a slot 105 in the upper end of the sleeve 100. Below the arm 99 is a sleeve 106 held stationary with respect to the frame work (standard 4), and between this sleeve and the lower hub of the arm 99 is a spring 107 which acts to force arm 99 against the face of cam 98. Between the upper hub of arm 99 and the hub of lever 103 is a second spring 108 which acts to hold the lever 103 with its pin 104 at the right hand end of slot 105 as shown in Fig. 39. Manually, the lever 103 may be moved to bring the pin 104 to the other end of the slot as shown in Fig. 40.

The lever 103 is a hand lever having the shape shown in Figs. 35, 36 and 37. On the arc shaped end of lever 103 is pivoted a dog or pawl 109 which is normally held against an abutment 110 by a spring 111 on pin 112. This spring is inclosed by a piece of tubing 113 as shown in Fig. 41.

Loosely mounted upon a pin in the framework is a large gear wheel 114 which meshes into a small gear 115 secured to a vertical shaft 116 (Figs. 2, 33 and 34). On the face of gear 114 are pins 117 which lie in the path of dog 109 and are engaged by said dog to turn wheel 114 when lever 103 is turned on its pivot 101. Normally, the arc face of lever 103 lies closely adjacent to two pins 117 and serves as a lock to prevent wheel 114 from being turned. Adjacent to catch 118 there is a notch 119 in the arc face of lever 103 into which notch one of the pins 117 may enter when the wheel is turned. Thus, when the lever 103 is in the position shown in Fig. 36 and is moved toward the position shown in Fig. 37, the catch 118 will engage that adjacent pin 117 to turn wheel 114, and in this turning the pin 117 will enter the notch 119 to prevent displacement. By the time the lever 103 has reached the position shown in Fig. 35 the engaged pin 117 will have been moved out of the notch 119 to clear the face of the arc on the lever 103 while the next pin to the rear will have engaged another part of the arc to stop the advance of gear wheel 114. By vibrating the lever 103 back and forth between the positions shown in Figs. 35 and 36 the wheel 114 may be advanced step by step and will be locked in position between steps. This advance of wheel 114 is made automatically by cam 98 acting upon arm 99 to move lever 103 in one direction and spring 107 to move it in the other. Or it may be made manually by moving the lever 103 in one direction by hand and permitting it to be moved in the other direction by spring 108.

On the shaft 116 is a worm 120 which engages gear 63 to turn the day type wheel 62 (Fig. 34). Meshing with the gear 63 is another gear 121 on the shaft 122 which carries drum 123. The wheel 62 carries abbreviations for the days of the week which are printed on the workman's time card. The drum 123 carries similar abbreviations which may be seen from the outside of the casing as shown in Fig. 31. As the drum and wheel 62 are geared together, the drum always shows what day of the week is being printed on the workman's time card.

Also on the shaft 116 is a worm 124 engaging gear 125 on shaft 126. On the shaft 128 (Fig. 34) is a lever 129 which has a pin 130 acted upon by cam 127 on shaft 126. The front end of lever 129 is in the form of a foot 131 arranged to support a workman's time card 132 at different elevations in front of the type wheels. The cam 127 acting upon a pin 130 raises the foot 131 gradually to a fixed extreme position, after which the foot falls by gravity to its extreme lower position. The lever 129 is preferably made as light as possible and is provided with a counterweight 133 so as to reduce the load on cam 127.

On the end of the shaft 97 are two disks or wheels 134 (Figs. 44, 45, 48 and 49) which are secured together by screws 135. These wheels have inwardly turned flanges 136 which are graduated on their outer faces as shown in Fig. 44. The inturned flanges 136 are short enough to leave an open space or slot 137. Through these slots project fingers 138 which can be adjusted to any graduation and secured in place by screws 139.

Secured to the bracket 88, or other convenient part of the framework, is a piece of insulation 140 on which is pivoted a brass plate 141, attached to which is a piece of insulation 142 provided with a beveled projection 143 normally held in the path of the fingers 138 by a spring 144. One part of the plate 141 extends over the top of the insulation 142 to form an electric contact point 145, while another part extends, in the form of a lip 146, under the insulation 140 to limit the movement by action of spring 144.

Also pivoted on 140 is a contact arm 147 pressed into contact with insulation 142 by spring 148. When the revolution of the wheel 134 brings a finger 138 against projection 143, the contact point 145 is moved under the end of contact arm 147 to close an electrical connection as shown in Fig. 47.

The electric circuit for this contact is shown in Fig. 32, and includes a battery 149, a bell 150, certain contact points 151 located on the dial of the clock, and the minute hand 152. If a finger 138 on wheel 134 operates to close the circuit on contact arm 147 at a time when the minute hand 152 is on one of the contacts 151, then the bell 150 will sound a signal. The wheel 134 makes one revolution in twenty-four hours, and is graduated as described. By setting the fingers 138 at proper graduations, the apparatus is made to ring the bell 150 for starting and stopping work.

Across the front of the machine is a rod 153 (Fig. 52), and mounted to slide longitudinally on this rod is a card receiver 154. It is of the same general type as ordinary card receivers, and is guided below by contact with shaft 17. It is illustrated in detail in Figs. 52, 53 and 57.

In a bearing in the front of the casing 1 is a short shaft 155. On the outer end of this shaft is secured a manually movable lever 156, while on the inner end of the shaft is secured an arm 157 having a forked end 158 adapted to engage a pin 159 on the card receiver 154. It will be evident that by moving the lever 156 by hand the card receiver may be adjusted to different positions on the rod 153.

Secured to the casing 1 above the shaft 155 is a quadrant 160 bearing certain inscriptions and having, in its inner margin, certain notches 161. The upper end of the lever 156 is slotted, as shown at 162 in Fig. 56, and in this slot is located a head 163 provided with a knob 164 located directly over a lug 165 on lever 156. A pin or plunger 166 secured to the head 163 and operating in an axial hole in the lever 156 serves as a means by which the head 163 may be moved to and from engagement with the notches 161 in quadrant 160. Spring 167 under plunger 166 serves to normally maintain such engagement, while knob 164 and lug 165 serve as convenient projections to be seized between thumb and finger for compressing the spring and releasing such engagement.

The motor spring located in spring case 13 drives a gear 168 (Fig. 1), and from this gear power is conveyed through a train of gearing to a bevel gear 169. Meshing with the gear 169 on one side is a bevel gear 90 which drives the type wheels, and on the other side is another bevel gear 170 secured to a vertical shaft 171. The upper end of the shaft 171 terminates in a socket 172 arranged to receive the lower end of the shaft 173 which is connected above to the clock mechanism 174 for controlling the speed of the type wheels and associated parts.

The bracket 102, previously mentioned as supporting or guiding the upper end of shaft 101 (Fig. 38), is made in the form of a frame for holding an "instruction card" (Fig. 2).

Reviewing in part some of the matters previously described it will be seen that all of the recording apparatus (except the ribbon feed) is driven from the bevel gear 90 through shaft 84, and that this gear 90 is driven from the clock-driving motor spring and is controlled directly by the clock. From the shaft 84 the drive is conveyed in two directions, one through the bevel gear 83 and the other through the worm 85, both of which are permanently secured to shaft 84.

From gear 83 the drive is through gears to the units wheel 56, and thence through interlocking mechanisms, which are in effect gears operating step by step, to the tens wheel 58 and the hour wheel 60. These interlocking mechanisms maintain the proper relationship of these wheels to each other at all times so that it is not possible for any one of them to get out of step with the others.

They (the interlocking mechanisms) also avoid the use of all pawls and ratchets and consequently there are no springs to compress or weights to lift.

The drive from bevel gear 83 is to the shaft 64, and this drive may be considered as uniform motion. The theoretical uniformity of the motion of this shaft is interrupted only when a workman, in pressing hand lever 8, causes the knife 73 to engage the star wheel 70. This temporary interruption is compensated for by the yielding connection in the form of the spring 93 of Fig. 42, or the normal slack in the driving connections.

From the shaft 64 there are three distinct drives to the wheels mounted upon shaft 21. The first of these is to the minute units wheel 56 through the gears 65 and 55. The forward movement of wheel 56 may be considered as uniform, such uniformity of motion being interrupted only by knife 73 for the purpose of centering the units character on the wheel at the printing point at the instant of printing action.

The second drive is a step by step movement conveyed once in ten minutes to the tens wheel 58. This drive is through the lock wheel 66 acting once in each revolution upon the pins 69 in main lock wheel 59. See Figs. 23 and 24.

The third drive is a step by step movement conveyed once in each hour to the hour wheel 60. This drive is through shaft 75 and gears 76 and 61. It is conveyed from shaft 21 to shaft 75 by the action of main lock wheel 59 three times in each revolution upon the pins 78 in lock wheel 77. In other words, the wheel 59 makes one revolution in three hours, the shaft 75 makes one revolution in twelve hours, and the wheel 60 makes one revolution in twenty four hours. See Figs. 17, 18, 21 and 22.

From the worm 85 the drive is through gears and cams to the day or calendar type wheel 62, the day or calendar drum 123, and the card lifting lever 129. These are all permanently connected together so that they move in unison at all times. They cannot get out of step with each other as in other time recorders. Neither can they get out of step with the wheels for hours and minutes. There is a manual adjustment operated by hand lever 103, but the shift produced by operating this lever is for an entire day and does not change the relationship of the beginning of the day to the hour wheel 60. That relationship is permanently maintained. The relationship of the signal controlling wheel 134 is also permanently maintained by reason of the fact that this wheel is fast to the same shaft as the gear 96 which is driven by worm 85.

As previously described, the yielding connection shown in Fig. 42 is related to the temporary stoppage of the units wheel by reason of knife 73 engaging star wheel 70. Workmen sometimes deliberately hold the operating lever 8, or its equivalent in other machines, depressed for a considerable length of time with the object of disarranging the recording mechanism. Unless the lever 8 should be held down continuously for about twenty minutes, (the time required for one revolution of shaft 84), such holding would not affect the clock mechanism because of the yield in spring 93. If the lever 8 should be held depressed for some minutes less than twenty and then released, the consequent release of the star wheel will permit the spring 93 to immediately advance the delayed type wheels to their proper relationship to the clock, and any subsequent operation will produce a correct record.

In any considerable period of time the knife 73 (Fig. 19) will strike a substantially equal number of times on both sides of all teeth of the star wheel. The bevel on the teeth of the star wheel and the bevel on the sides of the knife are so related to each other that any grinding action between the teeth and the knife tends to sharpen rather than blunt the points of the teeth. This makes it practically impossible that the knife should ever fail to properly enter the space between two teeth.

Other improvement in the construction and operation will be evident from the description hereinbefore given without special review at this place.

Each workman using the apparatus is provided with a time card of the ordinary kind. These cards are of a size which fit the receiver 154, and are provided with ruled spaces for receiving prints from the type wheels.

In using the apparatus the workman inserts his card in the receiver 154 and depresses the lever 8. Depressing the lever 8 turns the shaft 7, which operates through arm 14 and thrust rod 15 to first force outward the hammer arm 19 and then release it so that spring 18 may throw the hammer 20 against the back of the card and thus drive the card against the type wheels. The same movement of the arm 14 which moves the hammer 20 also tilts the lever 72 to bring knife 73 into contact with the star wheel 70 as shown in Fig. 20. As the star wheel is secured to shaft 64 which is geared directly to the units wheel 56, and indirectly to the other type wheels, the action of the knife 73 in centering the star wheel serves to bring the type characters on the wheels accurately in line at the printing point behind hammer 20. The same movement of the arm 14 also moves the link 37 (Figs. 6 and 7) to operate the ribbon device and thus bring a fresh part of the ribbon between the card and type wheels each time the workman depresses the lever 8. And still further, the same movement of the shaft 7, which carried arm 14, also operates through pawl 10 and ratchet 11 to slightly wind the clock spring in case 13. Briefly, the depression of the lever 8 by the workman to mark his card, also centers the type wheels, shifts the ribbon and winds the motor spring for the clock.

What I claim is:

1. In a clock driven time recorder, a type wheel for recording hours of the day, a device for supporting a card in front of said wheel, driving mechanism for moving said device so as to elevate the card to correspond with changes in the position of the type wheel, and connections between the typewheel and the card elevating mechanism so arranged that a manual adjustment of either necessarily results in a corresponding adjustment of the other.

2. In a time recorder, a type wheel designed to print different characters on a card held adjacent to the wheel, clock mechanism for advancing the wheel periodically to change the characters printed, an elevating device arranged to support a card at predetermined elevations when predetermined characters are being printed by the wheel, connections from the clock mechanism for moving the elevating device at times corresponding to the changes of the wheel, and interconnections between wheel and elevating device for preventing either from being displaced from the predetermined relationship between wheel and elevating device, said interconnections forming part of the previously mentioned connections from the clock mechanism.

3. In a time recorder, a wheel for printing different characters on a card, a device for supporting a card adjacent to the wheel, mechanism for moving said device so that the card will be supported at different elevations in predetermined relationship to the characters being printed by the wheel, interconnections between wheel and mechanism arranged to prevent a displacement of their predetermined relationship, by accident or setting of apparatus, and a clock apparatus for driving wheel and mechanism.

4. In a time recorder, a type wheel for printing characters on a card, an indicator for showing what characters are being printed at any time, a card supporter, a device for moving the card supporter so that the card supported thereby will be at predetermined elevations when predetermined characters are being printed, and interconnections between the card supporter and the wheel, said interconnections being arranged to hold the predetermined relationship between card supporter and wheel when the recorder is being set.

5. In a time recorder, the combination with a type wheel, an indicator therefor, and a movable lever for supporting a card at predetermined elevations adjacent to said wheel, of a driving mechanism permanently connected to all of said parts so that none may be displaced with respect to the others, and means by which said driving mechanism is moved intermittently to advance said parts step by step.

6. In a time recorder, the combination with a type wheel, an indicator non-displaceably connected thereto, and a card lifter, of a shaft geared to the type wheel and to the card lifter, and means for moving said shaft intermittently to advance said parts step by step.

7. In a time recorder, the combination with a type wheel, an indicator, a card lifter, and gearing permanently connecting said parts together so that none may be displaced with respect to the others, of automatically operating means for giving said gearing an intermittent movement.

8. In a time recorder, the combination with a type wheel, an indicator, a card lifter, and gearing permanently connecting said parts together so that none may be displaced with respect to the others, of a cam for intermittently moving said gearing a predetermined distance, and means for driving said cam.

9. In a time recorder, the combination with a type wheel, an indicator, a card lifter, and gearing for driving said parts, of a cam for intermittently moving said gearing a predetermined distance, manually operated devices for moving said gearing independent of said cam, and means for limiting each manually operated movement to the predetermined distance controlled by said cam.

10. In a time recorder, the combination with a type wheel, an indicator, a card lifter, and gearing connected to said parts, of a ratchet for advancing said gearing step by step, a clock controlled driving mechanism for operating said ratchet at predetermined intervals of time, and manually operated means for advancing said ratchet independently of said driving mechanism.

11. In a time recorder the combination with a wheel for printing days, an elevating device for supporting a card at a predetermined elevation for each day, and an indicator for showing what day is being printed by said wheel, of connections for holding said parts permanently in their predetermined relationship to each other, and an adjusting device operating upon said connections to move all of said parts simultaneously.

12. In a time recorder, a type wheel, a gear connected to said type wheel, pins projecting from said wheel, a lever having an arc shaped part engaging two of said pins to lock said gear from turning and having a notch in the arc shaped part for the admission of a pin to turn said gear, a spring actuated catch supported on said lever adjacent to said notch, and means for vibrating said lever.

13. In a time recorder, the combination with a type wheel for printing days, and a card lifter arranged to support a card adjacent to said wheel at a predetermined elevation for each day, of connections between the two for holding permanently the predetermined relationship, a manually operated adjusting device for advancing both simultaneously.

14. In the adjusting device of a time recorder, a wheel having pins corresponding to the teeth of a ratchet wheel, a vibrating pawl arranged to engage said pins to move said wheel, and a locking device associated with said pawl, said locking device being arranged to at all times engage either two sides of one pin or one side of each of two pins whereby said wheel is at all times prevented from any turning other than that performed by said pawl.

15. In the adjusting device of a time recorder, a wheel having pins corresponding to ratchet teeth, a power driven pawl for engaging said pins to turn said wheel, and an arc-shaped locking device associated with said pawl and arranged so that the arc of said device will engage two of said pins to prevent the turning of said wheel while the pawl is moving from one pin to the next.

16. In the adjusting device of a time recorder, a wheel having pins corresponding to ratchet teeth, a pawl for engaging said pins to turn said wheel, a spring for actuating the pawl, a clock driven mechanism for gradually retracting the pawl against the spring action after an advance of said wheel, and a locking device arranged to engage two of said pins and hold said wheel stationary during the clock driven movement of said wheel.

17. In the adjusting device of a time recorder, a wheel having pins corresponding to ratchet teeth, a spring actuated pawl for moving said wheel, a clock driven mechanism for retracting the pawl against the spring action, and a wheel locking device connected to and moving with the pawl.

18. In a time recorder, the combination with a printing wheel, a card elevating device, a clock mechanism, and connections from the clock to the wheel and elevating device for moving them simultaneously, of a pawl and ratchet apparatus by which such movement is intermittent, and a locking device attached to and moving with the pawl, said locking device being arranged to hold the wheel and elevating device from movement during the retracting movement of the pawl.

19. In the circuit closing device for a time recorder, a uniformly driven wheel consisting of two disks having inwardly turned flanges so arranged as to leave a peripheral slot therebetween, an adjustable contact finger extending through said slot and secured to the wheel by being clamped to said flanges, and a contact closing device supported adjacent to the wheel and operated by said finger during the rotation of the wheel.

20. In the step by step movement of a time recorder, a ratchet and a pawl, a cam for moving the pawl the distance of one step of the ratchet, a spring for retracting the pawl, a handle by which said pawl may be moved manually, and means by which such manual operation of the pawl will cause a full step movement of the ratchet when the cam is in any intermediate position.

Signed at Chicago, Illinois this 8th day of July, 1915.

TOREY ROSS.

Copies of this patent may be obtained for five cents each, by addressing the "Commissioner of Patents, Washington, D. C."